United States Patent [19]

Burgay et al.

[11] Patent Number: 5,574,459
[45] Date of Patent: Nov. 12, 1996

[54] DEVICE FOR THE DETECTION AND CHARACTERIZING OF RADAR PULSES

[75] Inventors: Olivier Burgay, Meudon; Philippe Leconte, Cesson, both of France

[73] Assignee: Thomson-CSF, Paris, France

[21] Appl. No.: 364,995

[22] Filed: Dec. 28, 1994

[30] Foreign Application Priority Data

Dec. 28, 1993 [FR] France ................................ 93 15745

[51] Int. Cl.⁶ ............................ G01S 13/87; G01S 13/76; G01S 7/292
[52] U.S. Cl. ............................ 342/40; 342/45; 342/32; 342/37
[58] Field of Search ................................ 342/30, 32, 37, 342/40, 45

[56] References Cited

U.S. PATENT DOCUMENTS

| | | | |
|---|---|---|---|
| 4,024,538 | 5/1977 | Bishop | 342/45 |
| 5,001,751 | 3/1991 | Sanford et al. | 380/23 |
| 5,063,386 | 11/1991 | Bourdeau et al. | 342/40 |
| 5,073,779 | 12/1991 | Skogmo et al. | 342/37 |
| 5,089,822 | 2/1992 | Abaunza et al. | 342/30 |
| 5,157,615 | 10/1992 | Brodegard et al. | 364/461 |
| 5,198,823 | 3/1993 | Litchford et al. | 342/429 |
| 5,363,109 | 11/1994 | Hofgen et al. | 342/31 |
| 5,387,915 | 2/1995 | Moussa et al. | 342/40 |
| 5,388,047 | 2/1995 | Ryan et al. | 364/461 |
| 5,406,288 | 4/1995 | Billaud et al. | 342/37 |
| 5,432,517 | 7/1995 | Billaud et al. | 342/40 |

FOREIGN PATENT DOCUMENTS 0577479  1/1994  European Pat. Off. .

*Primary Examiner*—John B. Sotomayor
*Attorney, Agent, or Firm*—Oblon, Spivak, McClelland, Maier, & Neustadt, P.C.

[57] ABSTRACT

The device comprises an analog-digital converter coupled between a pulse receiver and a device to extract the continuous level of the signal given by the receiver. The continuous level extraction device is coupled to an edge detection device and to a scrambling characterizing device to detect the presence of rising or descending edges and of scramblers in the signal given by the receiver.

12 Claims, 4 Drawing Sheets

DEVICE FOR THE DETECTION AND CHARACTERIZING OF RADAR PULSES

BACKGROUND OF THE INVENTION

The present invention relates to a device for the detection and characterizing of radar pulses and notably of monopulse secondary radar pulses.

In monopulse secondary radars, the pulse has to meet a certain number of criteria related to duration and level in order to be considered as forming part of a message. The duration is assessed, for example, to reject those pulses that do not meet the characteristics of an IFF (Identification Friend or Foe) pulse. The decoding is done by assessing the spacing between the pulses that constitute the message, the pulses of one and the same message having comparable levels. The relative level of the pulses with respect to one another enables the pulses received to be associated with a given message. Since it happens that pulses forming part of different messages may overlap and prompt confusion in the decoding of the messages, the device for the detection of monopulse radars is responsible for separating the overlapping pulses and characterizing them in terms of width and level. The detection device also takes account of the different types of scrambling in order to minimize their effects on the detection of pulses.

In the prior art, the detection of pulses takes place in an analog manner. It consists in eliminating the continuous component of the signal and in making a detection of pulse edges by a shift of the level of the incident signal and by comparison after storage of the result with a predetermined threshold value. Unfortunately, the behavior under AMCW (Amplitude Modulation Continuous Wave) type scrambling notably of the corresponding pulse detectors is poor. Moreover, the performance characteristics of the message decoders undergo substantial deterioration through pulse scrambling, all the more so as these devices carry out practically no treatment on the pulses. Finally, the detection rate remains small for a low signal-to-noise ratio (8 to 10 dB).

SUMMARY OF THE INVENTION

The aim of the invention is to overcome the above-mentioned drawbacks.

To this end, an object of the invention is a device for the detection and characterizing of radar pulses comprising a receiver of pulses, wherein said device comprises an analog-digital converter device coupled between the pulse receiver and a device for the extraction of the continuous level of the signal given by the receiver, and wherein the device for the extraction of the continuous level is coupled to an edge detection device and to a scrambling characterizing device to detect the presence of the rising and descending edges and of scramblers in the signal given by the receiver.

BRIEF DESCRIPTION OF THE DRAWINGS

Other features and advantages of the invention shall appear from the following description, made with reference to the appended drawings, of which.

DESCRIPTION OF THE PREFERRED EMBODIMENTS

Figure 1:
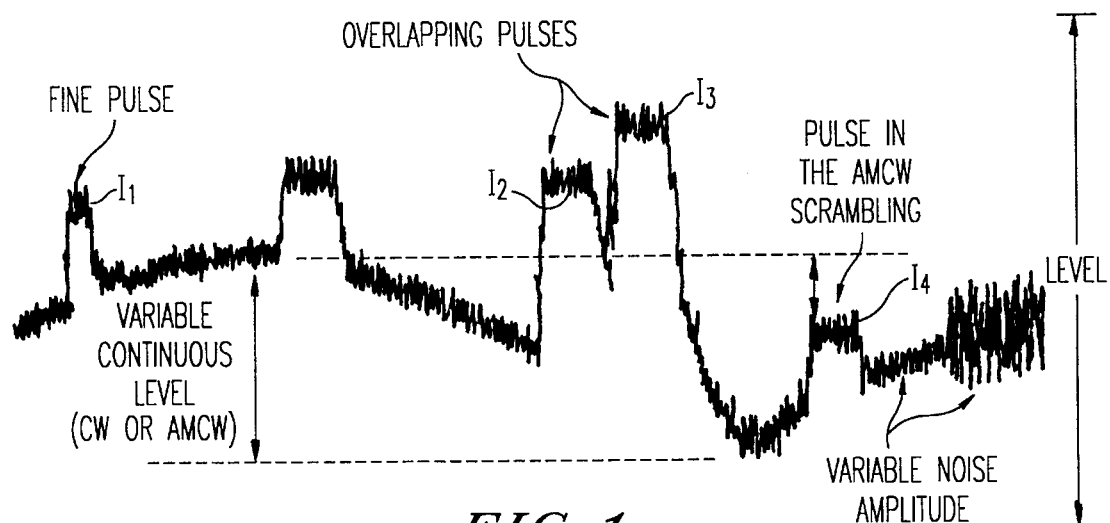
FIG. 1 shows a graph of monopulse secondary radar pulses.

The different signal elements to be taken into account in a system for the detection of pulses coming from a secondary radar are shown in FIG. 1. These pulses are formed, in the example, by fine pulses $I_1$, overlapping pulses $I_2$, $I_3$ and pulses $I_4$ drowned in an AMCW type scrambling for example. These pulses are juxtaposed with a noise at a variable continuous level.

Figure 2:
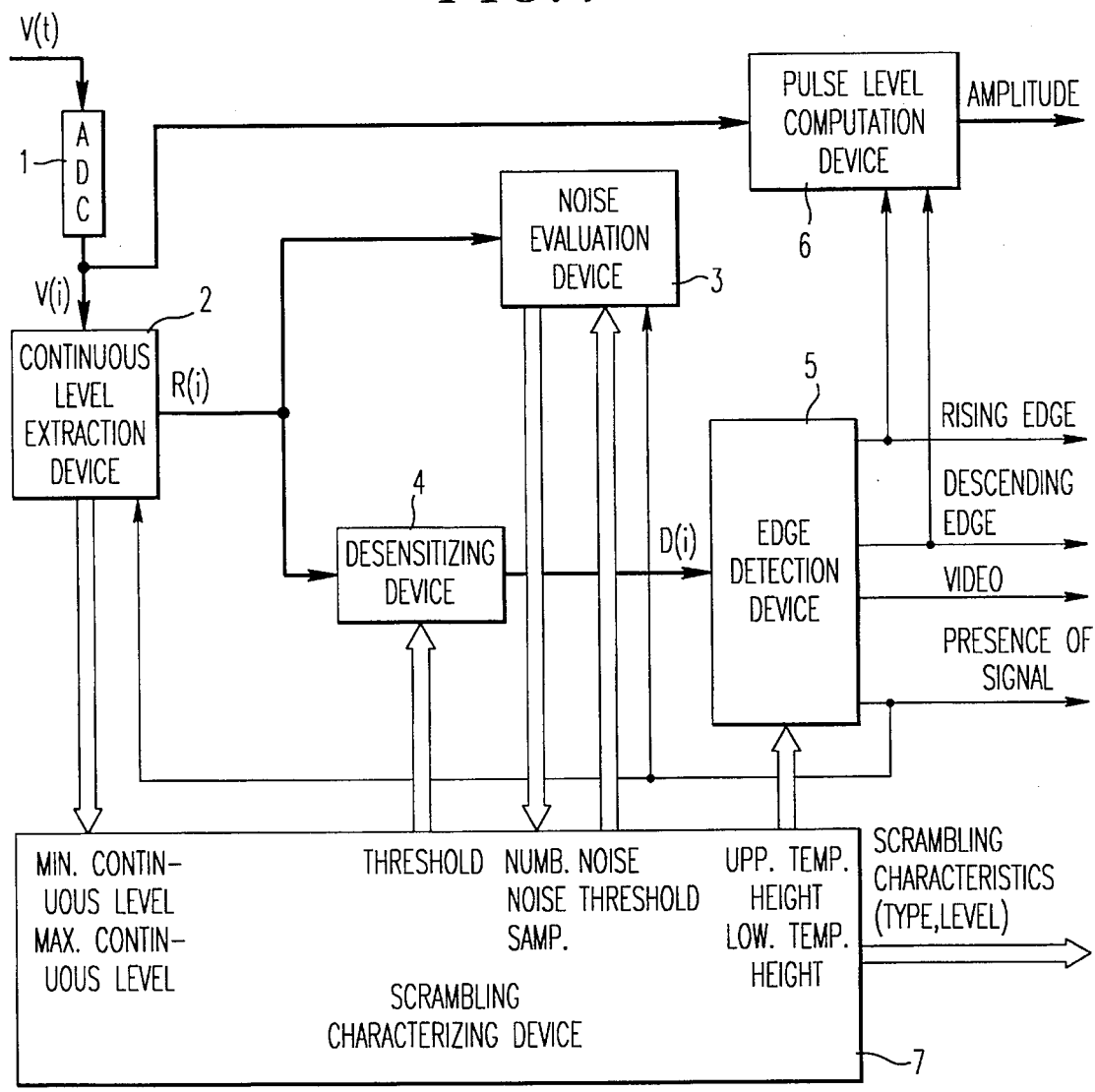
FIG. 2 shows a general block diagram of a pulse detection device for monopulse secondary radars according to the invention.

The detection device according to the invention, shown in FIG. 2, has an analog-digital converter (ADC) (1), a continuous level extraction device 2, a device 3 to assess the noise, a desensitizing device 4, an edge detection device 5, a pulse level computation device 6 and a scrambling characterization device 7.

The analog signal V(t), coming from a receiver (not shown) of a secondary radar, is sampled by the analog-digital converter 1 at a frequency $f_0$ on a determined number of bits N compatible with the desired performance characteristics. The binary samples obtained are applied, firstly, to the input of the continuous level extraction device 2 and, secondly, to the input of the pulse level computation device 6. The continuous level of the signal Ri that is extracted by the device 2 is applied, firstly, to the input of the noise evaluation device 3 and, secondly, to the edge detection device 5 by means of the desensitizing device 4.

The pulse level computation device 6 computes the level of the pulses as a function of the samples given by the analog-digital converter 1 and information indicating the rising or descending edge given by the edge detection device 5.

The device 7 characterizes the scrambling as a function of the continuous level extracted by the device 2 and the noise level detected by the noise evaluation device 3.

Figure 3:
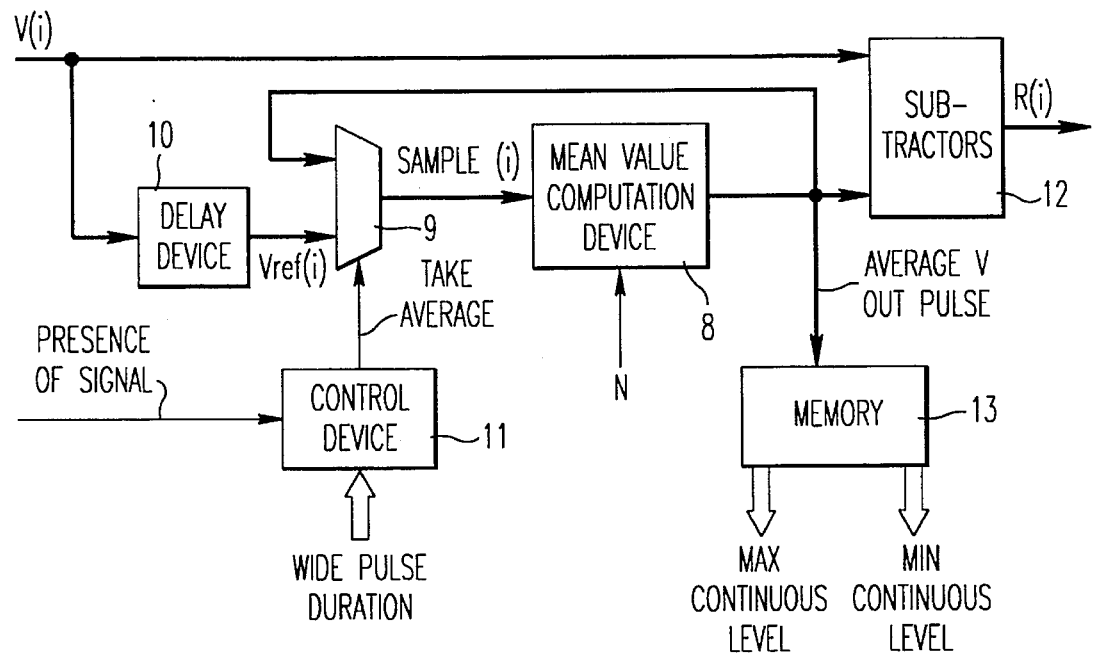
FIG. 3 shows an embodiment of the continuous level extraction device implemented in the device of FIG. 2.

The extraction device 2, as shown in FIG. 3, has a average value computation circuit 8 formed by an accumulator register or any equivalent device coupled by its input to the output of a two-input multiplexer 9. The first input of the multiplexer 9 is connected to the output of the circuit 8. Its second input receives the signal samples Vret(i) equivalent to the samples V(i) given by the converter 1 but delayed by a determined duration τ by means of a delay device 10. The totalizing of the samples in the circuit 8 takes place on $N=2^m$ successive samples.

In the case of an embodiment using an accumulator register, the totalized result obtained is offset in the register to abandon the m least significant bits in order to obtain a average value of the N samples. A control device 11 provides for the control of the multiplexer 9. A subtracter circuit 12 with two operand inputs receives, at a first input, the samples V(i) coming from the analog-digital converter 1 and, at its second input, the average value of the signal contained in the accumulator register 8. The result obtained at the output of the subtracter circuit 12 therefore corresponds to the signal V(i) minus the continuous component.

In FIG. 3, a signal "PRESENCE OF SIGNAL" is applied to the control circuit 11 whenever a pulse is detected by the detection device 5 of FIG. 2, with a delay related to the delay time τ. The circuit 11 either positions or does not position a signal "TAKE AVERAGE". When the signal "TAKE AVERAGE" is not positioned, the signal sample Vret(i) is taken into account by the multiplexer circuit 9 to be applied to the input of the average value computation circuit 8.

When the signal "TAKE AVERAGE" is positioned, namely when there is no detected pulse, the incoming sample taken into account by the average value computation circuit 8 corresponds to the last average computed and designated by AVERAGE V Out PULSE in FIG. 3.

The signal "TAKE AVERAGE" is given by the circuit 11 when the signal "PRESENCE OF SIGNAL" has already been positioned for at least a duration designated as "Max PULSE DURATION" so that it is possible to recommence the computation or the continuous level should the pulse detected be a very wide pulse corresponding to the appearance of a scrambler for example.

A sliding average "AVERAGE V Out PULSE" is thus computed on N successive samples, N being programmable and capable of taking, for example, the values 4, 8 or 16. At the output of the subtracter circuit 12, the signal Ri obtained is the signal Vi from which there is deducted the continuous level "AVERAGE V Out PULSE".

The maximum and the minimum taken by the variable "AVERAGE V Out PULSE" is stored in a memory 13 and the corresponding levels "max continuous level", "min continuous level" are read and reinitialized by the scrambler characterizing device 7.

A corresponding implementation algorithm may be the following one:

```
Vret(i) = V(i-3)                    (150 ns delay)
SAMP(i) = Vir(t)   if TAKE AVERAGE = 0
        = AVERAGE V OUT PULSE if TAKE AVERAGE = 1
AVERAGE = PRESENCE OF SIGNAL AND NOT
PRESENCE OF SIGNAL delayed by MAX PULSE DURATION
AVERAGE V_OUT-MP = (SAMP(i) + SAMP(i-1)
     + ... + SAMP(i-(N-1)))/N
``` where N is the number of samples taken into account in the averaging operation

```
R(i) = V(i) - AVERAGE V_OUT_PULSE if V(i)-AVERAGE
V_OUT_PULSE>0
     = 0 if V(i)-AVERAGE V_OUT_PULSE<0
MIN_CONTINUOUS_LEVEL = minimum of AVERAGE V_OUT_PULSE
during T
MAX_CONTINUOUS_LEVEL = maximum of AVERAGE V_OUT _PULSE
during T
```

The signal Ri obtained is transmitted to the desensitizing device 4 in order to desensitize the detection device 5 in varying degrees. This desensitizing takes place by removing a constant signal level hereinafter called "THRESHOLD" to form a sample Di on condition that if Ri-"THRESHOLD" is greater than zero then Di=R(i)-THRESHOLD or that if Ri-"THRESHOLD" is smaller than zero then Di takes the zero value.

The edge detection function performed by the detection device 5 achieves the recognition of the rising and descending edges on the signal samples $D_i$ given by the desensitizing device 4 of FIG. 2. In this respect, it is the core of the pulse detection device.

In the detection principle adopted, an edge is defined as the overflow of a reference level by two successive samples $D_i$. The algorithm implemented consists in ascertaining that the samples $D_{(i)}$ remain within a set of limit values or template by a comparison of the magnitude of the samples (Di) with determined higher values "UPPER TEMP" and lower values "LOWER TEMP" of this template. The crossing of this template by a higher value (D(i)>UPPER TEMP) leads to the detection of a rise of a signal and prompts a changing of the template. The crossing by a loweralue (Di<LOWER TEMP) leads to a detection of a descending of the signal and also prompts a changing of the template (CHANGE TEMP). The values UPPER TEMP and LOWER TEMP are computed on the basis of the magnitude of the sample D(i-1) preceding the current sample Di and of the magnitudes UPPER TEMPLATE HEIGHT and LOWER TEMPLATE HEIGHT. The presence of a useful signal is reported by a signal PRESENCE OF SIGNAL. An overflow by a higher value (D(i)>UPPER TEMPLATE HEIGHT) leads to the detection of a presence of a signal.

Figure 4:
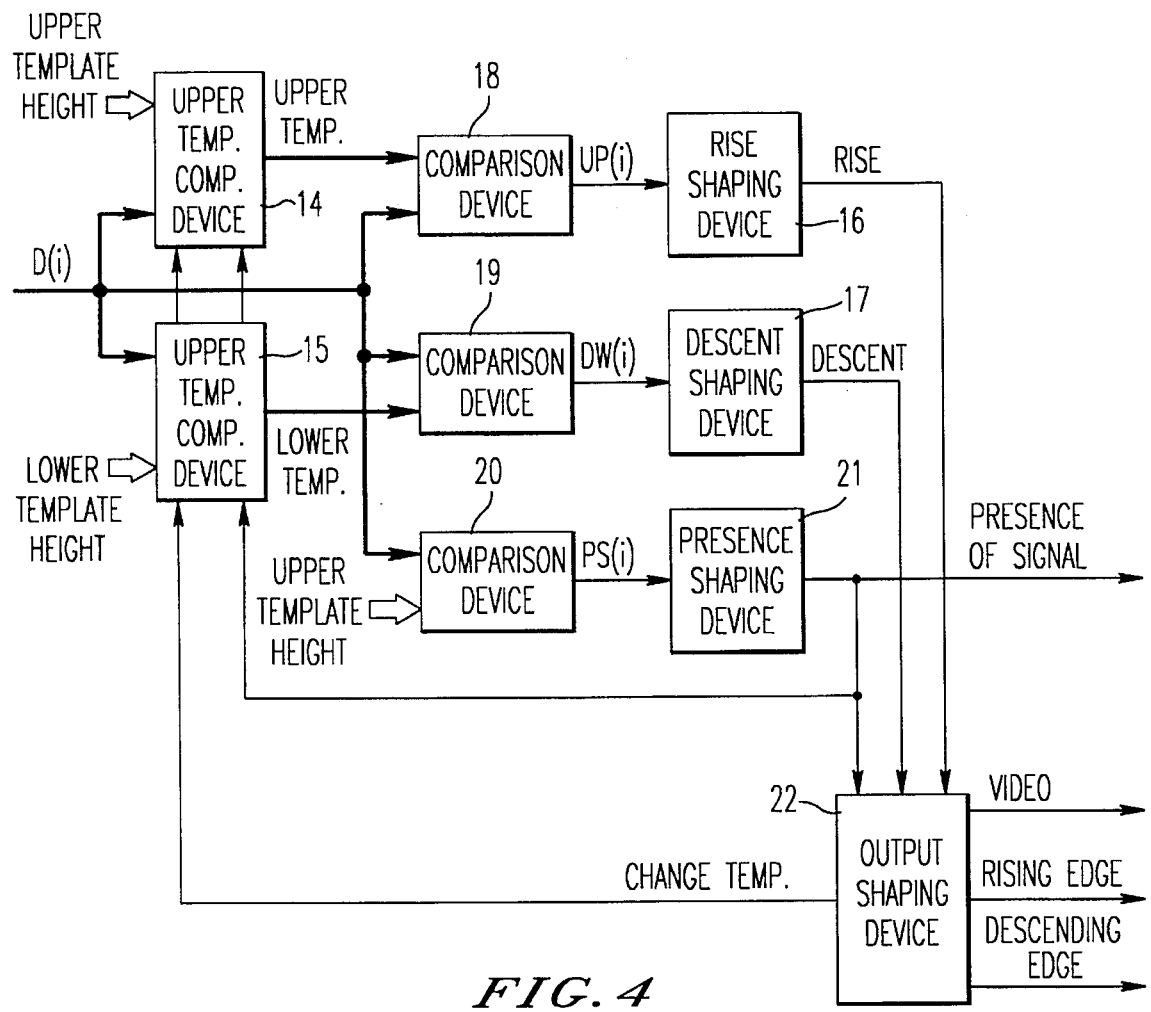
FIG. 4 shows an embodiment of the edge detection device implemented in the device of FIG. 2.
Figure 5:
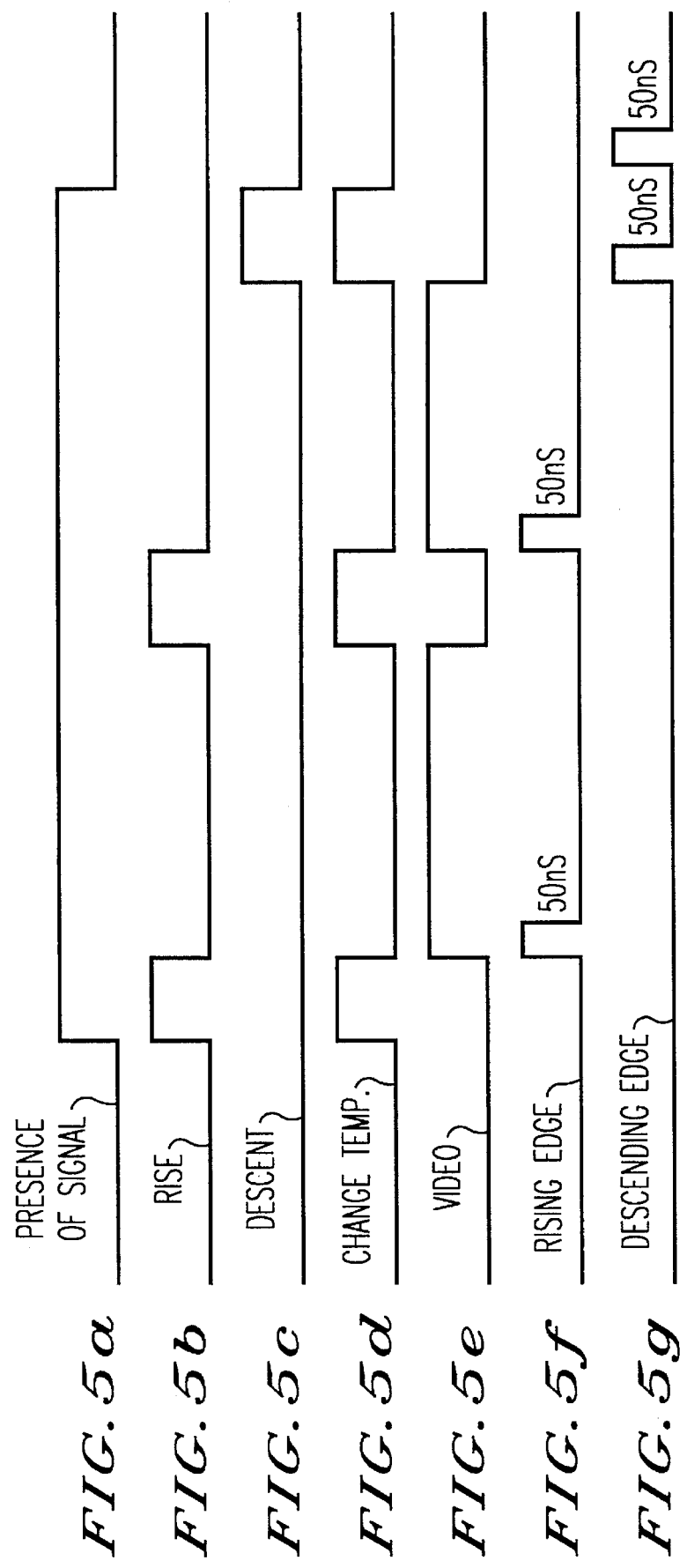
FIGS. 5a through 5g is a graph to illustrate a device of FIG. 4.

The edge detection device 5 corresponding to this operation comprises, as shown in FIG. 4, two devices 14, 15 for the computation of the upper and lower templates respectively coupled to shaping stages 16 and 17 by means of comparison devices 18 and 19. It also has a comparison device 20 coupled to a shaping stage 21. A shaping device 22 reshapes the signal edges given by the stages 16, 17 and 21 and transmits a template changing signal to the computation device 15. The heights of the upper and lower templates are given by the device 7 of FIG. 2 and are applied respectively to first inputs of the computation devices 14 and 15. The height of the current sample Di is applied to the second inputs of the devices 14 and 15. Depending on the state of the control signal "CHANGE TEMPLATE" given by the shaping device 22 and the state of the "PRESENCE OF SIGNAL" given by the shaping device 21, the values "UPPER TEMP" and "LOWER TEMP" given by the computation devices 14 and 15 are either unchanged if the signal "CHANGE TEMP" is in the binary state 0 or modified respectively depending on the values D(i-1)+UPPER TEMPLATE HEIGHT or D(i-1)-LOWER TEMPLATE HEIGHT if the signal "CHANGE TEMP" is in the binary state 1 or, again, placed at the UPPER TEMPLATE HEIGHT if the signal "PRESENCE OF SIGNAL" is at the binary level 0, or placed at the level 0 if the signal "PRESENCE OF SIGNAL" is at the level 0. The comparison circuit 18 gives a signal "UP" having a binary level 1 if D(i)>UPPER TEMP. If not it gives a signal with a binary level 0. The comparison circuit 19 gives a signal DW(i) with a binary level 1 if D(i)<LOWER TEMP or, if not, a signal with a binary level 0. The comparison circuit 20 gives a signal PS(i) with a binary level 1 when Di>UPPER TEMPLATE HEIGHT and, if not, a signal with a binary level 0. The shaping circuit 16 gives a signal "RISE" having a binary level 1 when, at the current instant i, the signal "UP"=1 and when, at the previous instant i-1, the signal "UP"(i-1) was already in the state 1.

The signal "RISE" is placed at the level 0 if "UP" at the instant (i)=0 and "UP" at the instant i-1 are at the level 0. In the other cases, the signal RISE is unchanged.

The signal "DESCENT" given by the shaping stage 17 is placed at the level 1 when the signals Dw(i) and Dw(i−1) are in the state 1. The signal "DESCENT" is placed at the level 0 when the signal DW(i)=0 and the signal DW(i−1)=0. In the other cases, the signal DESCENT is unchanged. The signal PRESENCE OF SIGNAL is placed in the state 1 if the signal PS(i) given by the comparison device 20 is in the state 1 and if the signal PS(i−1) at the previous instant i−1 is also in the state 1. It is placed in the state 0 if the signals PS(i) and PS(i−1) are in the state 0. In the other cases, the signal PRESENCE OF SIGNAL remains unchanged. The signal CHANGE TEMP given by the shaping device 22 is placed in the state 1 if the signals PRESENCE OF SIGNAL, RISE and DESCENT are simultaneously in the state 1. Otherwise, the signal CHANGE TEMP takes the value 0.

The shaping device 22 also gives binary signals referenced RISING EDGE, DESCENDING EDGE and VIDEO. The signal RISING EDGE takes the binary value 1 when the signal RISE(i) of the instant i and that of the instant (i−1) respectively have the values 0 and 1. This signal takes the value 0 in the other cases. The signal DESCENDING EDGE takes the binary value 1 if the signals DESCENT(i) of the instant i and DESCENT of the instant (i−1) are respectively at the values 1 and 0 or if the signals PRESENCE OF SIGNAL (i) of the instants i and i−1 both have the value 0. In the other cases, the signal DESCENDING EDGE takes the value 0. The signal VIDEO takes the value 1 if the signals "PRESENCE OF SIGNAL", "RISE" and "DESCENT" respectively have the values 1, 0 and 0. If not, the signal VIDEO takes the value 0.

Figure 7:
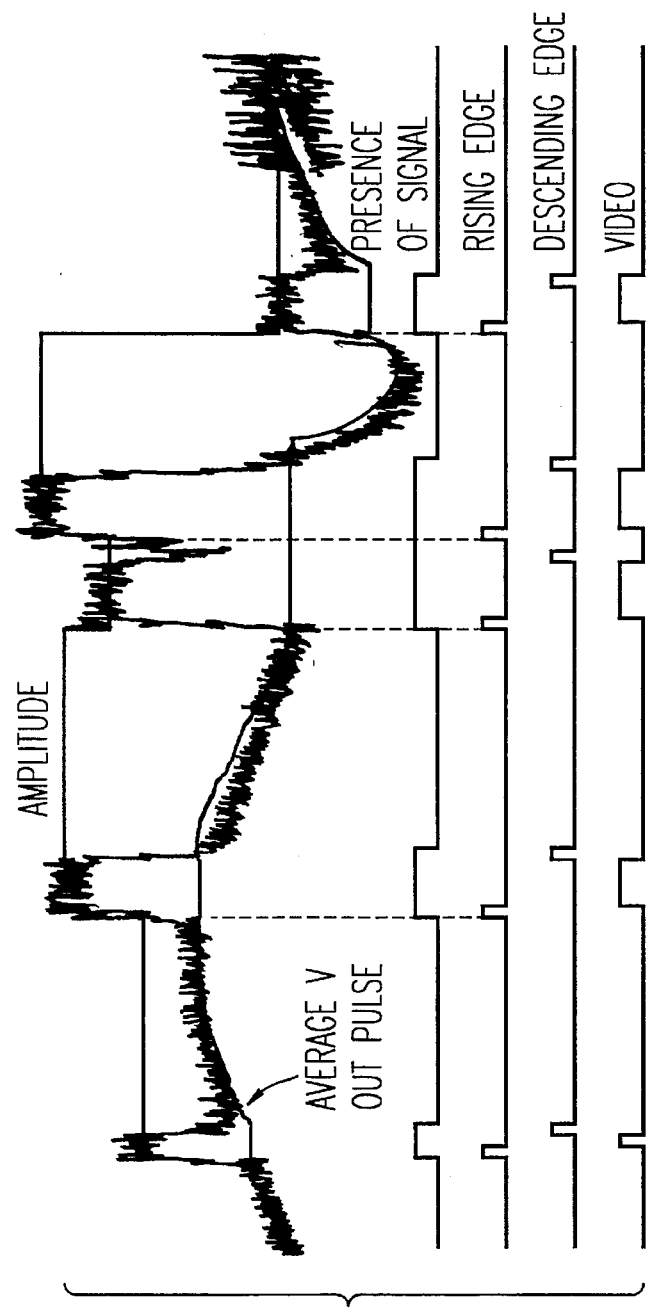
FIG. 7 shows an example of the generation of signals characteristic of signal edges.

The above different cases are illustrated in the timing diagram of FIGS. 5a through 5g and illustrated by the diagram of FIG. 7.

The corresponding algorithm is as follows:

```
* UPPER TEMP = unchanged           if CHANGE TEMP = 0
            = D(i+1) + UPPER TEMP HEIGHT if CHANGE TEMP + 1
            = UPPER TEMP HEIGHT if PRESENCE OF SIGNAL = 0
* LOWER TEMP = unchanged           if CHANGE TEMP = 0

= D(i−1) − Lower TEMP HEIGHT   if CHANGE TEMP + 1
            = 0                             if PRESENCE OF SIGNAL = 0

* UP(i)         = 1       if D(i) > UPPER TEMP
                = 0       if D(i) < UPPER TEMP
* DW(i)         = 1       if D(i) < LOWER TEMP
                = 0       if D(i) > LOWER TEMP
* PS(i)         = 1       if D(i) > UPPER TEMPLATE HEIGHT
                = 0       if D(i) < UPPER TEMPLATE HEIGHT
* RISE          = 1       if UP(i) = 1 AND UP(i−1) = 1
                = 0       if UP(i) = 0 AND UP(i−1) = 0
                = unchanged    else
* DESCENT       = 0       if DW(i) = 1 AND DW(i−1) = 1
                = 0       if DW(i) = 1 AND DW(i−1) = 0
                = unchanged    else
* PRESENCE OF SIGNAL = 1 if PS(i) = 1 AND PS(i−1) = 1
                     = 0 if PS(i) = 0 AND PS(i−1) = 0
                     = unchanged    else

* CHANGE TEMP = 1 if PRESENCE OF SIGNAL = 1
                  AND RISE = 1 AND DESCENT (i) = 1
              = 0  else
* RISING EDGE = 1 if RISE = 1 if RISE (i) = 0
                  and RISE(i−1) = 1   (end of a RISE)
              = 0   else

* DESCENDING EDGE = 1 if DESCENT (i) = 1
                    and DESCENT (i−1) = 0 (start of a descent)
                  OR
                    PRESENCE OF SIGNAL (i) = 0
                    and PRESENCE OF SIGNAL (i−1)=0(end of a
                    PRESENCE OF SIGNAL)
                  = 0   else
* VIDEO = 1              if PRESENCE OF SIGNAL = 1
                         and RISE = 0 and DESCENT (i) = 0
        =                else
```

Figure 6:
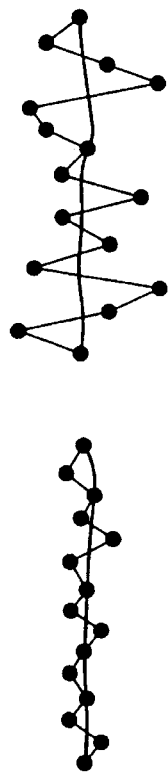
FIG. 6 shows two modes of situations of the level of the signal outside of the pulses.

The noise evaluation function performed by the device 3 enables the quantifying of the dispersal of the samples about the continuous level outside the pulses in order to characterize the quality of the signals outside the pulse. The aim is to enable the differentiating of the situations such as those shown in FIG. 6.

To reduce this, the device 3 makes a count, by time units, of the number of samples going beyond a determined noise threshold. The result of this counting, designated by NUM NOISE SAMP in FIG. 2 is taken into account at regular intervals by the characterizing device 7.

One algorithm that enables an implementation of this function may be the following one:

```
* NUM NOISE SAMP = NUM NOISE SAMP + 1 if R(i) >
NOISE THRESHOLD
        AND PRESENCE OF SIGNAL = 0
= NUM NOISE SAMP PRESENCE OF SIGNAL = 1
= 0 when taken into account by the function (6)
```

The pulse level computation function performed by the device 6 enables a level to be associated with the signal "VIDEO".

For this purpose, the signal V(i) is repositioned temporally in order to take account of the delay generated by the devices 2, 4 and 5 of FIG. 2 on the signals RISING EDGE and DESCENDING EDGE.

The signal AMPLITUDE is associated with the RISING EDGE and corresponds to the arithmetical average of the four samples that follow the pulse RISING EDGE provided that no pulse DESCENDING EDGE appears during these four cycles. This makes it possible to provide for the elimination of fine pulses of 200 ns or less, for example.

The following may be a corresponding algorithm:
* If p is the sample that has generated the RISING EDGE pulse (namely if p and p−1 have exceeded the template UPPER TEMP)

$$AMPLITUDE=(V(p)+V(p+1)+V(p+2)+V(p+3))/4$$

if no DESCENDING EDGE pulse has arrived during the cycles p to p+3.

The function of characterizing the scrambling and dynamic matching of the detection characteristics that is performed by the device 7 makes it possible to check all the detection parameters.

This device 7 carries out, at regular time intervals T (typically 20 ms intervals), the reading of the measurements MIN CONTINUOUS LEVEL, MAX CONTINUOUS LEVEL and NUM NOISE SAMP given by the devices 2 and 3 of FIG. 2 and causes them to be taken into account and reset.

The characterizing of a scrambling takes place by the comparison of the number of noise samples, designated as NUM NOISE SAMP, given by the device 3 with a MAX NUM NOISE SAMP. It makes it possible to determine a WGN (White Gaussian Noise) or AMCW type of scrambling.

The comparison of the MIN CONTINUOUS LEVEL and MAX CONTINUOUS LEVEL values makes it possible to differentiate an AMCW and CW scrambling.

The average level of the scrambling is given by:
SCRAMBLER LEVEL=(MIN CONTINUOUS LEVEL+ MAX CONTINUOUS LEVEL)/2
* IF NUM NOISE SAMP>MAX NUMB NOISE SAMP
  then PRESENCE of a WGN scrambling
* IF (MAX CONTINUOUS LEVEL–MIN CONTINUOUS LEVEL)>START AMCW
  then PRESENCE of an AMCW scrambling
  else PRESENCE of a CW scrambling
of SCRAMBLER LEVEL=(MIN CONTINUOUS LEVEL+ MAX CONTINUOUS LEVEL)/2

The dynamic matching of the characteristics of detection by placing the detection threshold of noise sample counting takes place systematically at X db below the detection threshold called THRESHOLD. This takes place by making a count, in the variable NUMB NOISE SAMP, of the number of samples between NOISE THRESHOLD and THRESHOLD.

```
At each reading of the value NUMB NOISE SAMP:
* If NUMB NOISE SAMP > MAX NUMBER 1
    then THRESHOLD = THRESHOLD + 1
         NOISE THRESHOLD = NOISE THRESHOLD + 1
* If NUMB NOISE SAMP > MAX NUMBER 2
    then THRESHOLD = THRESHOLD + 10
         NOISE THRESHOLD = NOISE THRESHOLD + 10
* If NUMB NOISE SAMP < MAX NUMBER 1
    then THRESHOLD = THRESHOLD - 1
         NOISE THRESHOLD = NOISE THRESHOLD - 1
* If NUMB NOISE SAMP < MAX NUMBER 2
    then THRESHOLD = THRESHOLD - 10
         NOISE THRESHOLD = NOISE THRESHOLD - 10
```

If the signal-to-noise ratio diminishes, the useful signal tends to be less stable at the peak of the pulse. It is then necessary to increase the value of the UPPER TEMPLATE HEIGHT and LOWER TEMPLATE HEIGHT at the risk of causing a less efficient separation of the overlapping pulses but with the advantage of obtaining improved behavior under scrambling. Under these conditions, the algorithm may be complemented as follows:
* IF SCRAMBLER LEVEL>MAX SCRAMBLER
  then double TEMPLATE HEIGHT
* IF SCRAMBLER LEVEL<MAX SCRAMBLER
  then return to nominal TEMPLATE HEIGHT Naturally, the above-described device for the implementation of the invention is not unique. It is clear that other embodiments are possible, notably by replacing the wire circuits of the device by one or more microprocessors appropriately programmed according to the algorithms described.

What is claimed is:

1. A device for the detection and characterization of radar pulses in a received signal, said device comprising:

an analog-digital converter device receiving said signal;

an extraction device for extracting the continuous level of the signal;

an edge detection device coupled to said extraction device;

a scrambling characterizing device coupled to said extraction device for detecting the presence of rising and descending edges and of scramblers in said signal.

2. A device according to claim 1, further comprising a noise evaluation device coupled between the continuous level extraction device and the scrambling characterizing device.

3. A device according to claim 1, wherein a desensitization device is coupled between the continuous level extraction device and the edge detection device.

4. A device according to claim 3, wherein a pulse level computation device is coupled to the output of the analog-digital converter.

5. A device according to claim 4, wherein the continuous level extraction device has a circuit to compute the average value of the signal samples given by the analog-digital converter coupled to a subtractor circuit to subtract the computed average value from the signal samples given by the analog-digital converter.

6. A device according to claim 5, wherein the continuous level extraction device comprises a memory to memorize the maximum and minimum values computed by the circuit for the computation of the average value.

7. A device according to claim 6, wherein the detection device includes a first circuit and a second circuit for the computation of a respectively upper template and lower template of the signal samples, coupled respectively to a first comparator circuit and a second comparator circuit to detect the rising and descending edges of the signal.

8. A device according to claim 7, wherein the detection device comprises a third comparator circuit to compare the level of the signal with the upper template height to report the presence of a pulse signal.

9. A device according to claim 8, wherein the noise evaluation device counts the number of signal samples given by the extraction device which goes beyond a determined threshold to apply it to the characterization device.

10. A device according to claim 9, wherein the characterization device carries out the reading of the maximum and minimum continuous levels of the signal given by the extraction device and of the number of signal samples given by the noise evaluation device to characterize the signal scrambler signals.

11. A device according to claim 10, wherein the characterizing device adjusts the heights of the reference templates for the computation of the upper and lower templates performed by the template computation devices.

12. A device according to claim 11, wherein the continuous level extraction, noise evaluation, threshold detection, edge detection, pulse level computation and scrambling characterizing devices are formed by one or more microprogrammed microprocessors.

* * * * *